United States Patent [19]

Fukuda et al.

[11] Patent Number: 4,679,188
[45] Date of Patent: Jul. 7, 1987

[54] DIGITAL TRANSMISSION SYSTEM

[75] Inventors: Misao Fukuda, Tokyo; Toshitaka Tsuda, Yokohama; Kazuo Murano, Tokyo; Yutaka Awata, Kawasaki, all of Japan

[73] Assignee: Fujitsu Limited, Kawasaki, Japan

[21] Appl. No.: 779,639

[22] Filed: Sep. 24, 1985

[30] Foreign Application Priority Data

Sep. 26, 1984 [JP] Japan .................................. 59-201021
Dec. 28, 1984 [JP] Japan .................................. 59-276354
Mar. 28, 1985 [JP] Japan .................................. 60-064371
May 31, 1985 [JP] Japan .................................. 60-117860

[51] Int. Cl.$^4$ ........................... H04B 1/56; H04J 3/02; H04L 7/00
[52] U.S. Cl. ........................................ 370/29; 370/85; 370/100; 375/107
[58] Field of Search ...................... 370/24, 32, 29, 100, 370/85, 26; 375/114, 107; 179/170.2; 379/344

[56] References Cited

U.S. PATENT DOCUMENTS 3,641,274  2/1972  Sasaki et al. ........................ 375/114
4,229,815  10/1980  Cummiskey ........................ 370/85
4,564,838  1/1986  Boulgne et al. ...................... 370/85

Primary Examiner—Douglas W. Olms
Assistant Examiner—Frank M. Scutch, III
Attorney, Agent, or Firm—Staas & Halsey

[57] ABSTRACT

A digital transmission system comprising at least two transmitting-receiving (T/R) units and a single transmission line connected therebetween. One of the T/R unit the first transmits a control signal to the other T/R units with which frame synchronization and timing recovery are carried out with using the thus transmitted control signal. At the same time, the other T/R unit inhibits transmission of send signal therefrom to the first T/R unit. Further, the send signal from one T/R unit to the other T/R unit is transmitted in the form of a frame. Each frame includes, at its end portion, a non-signal duration portion.

31 Claims, 53 Drawing Figures

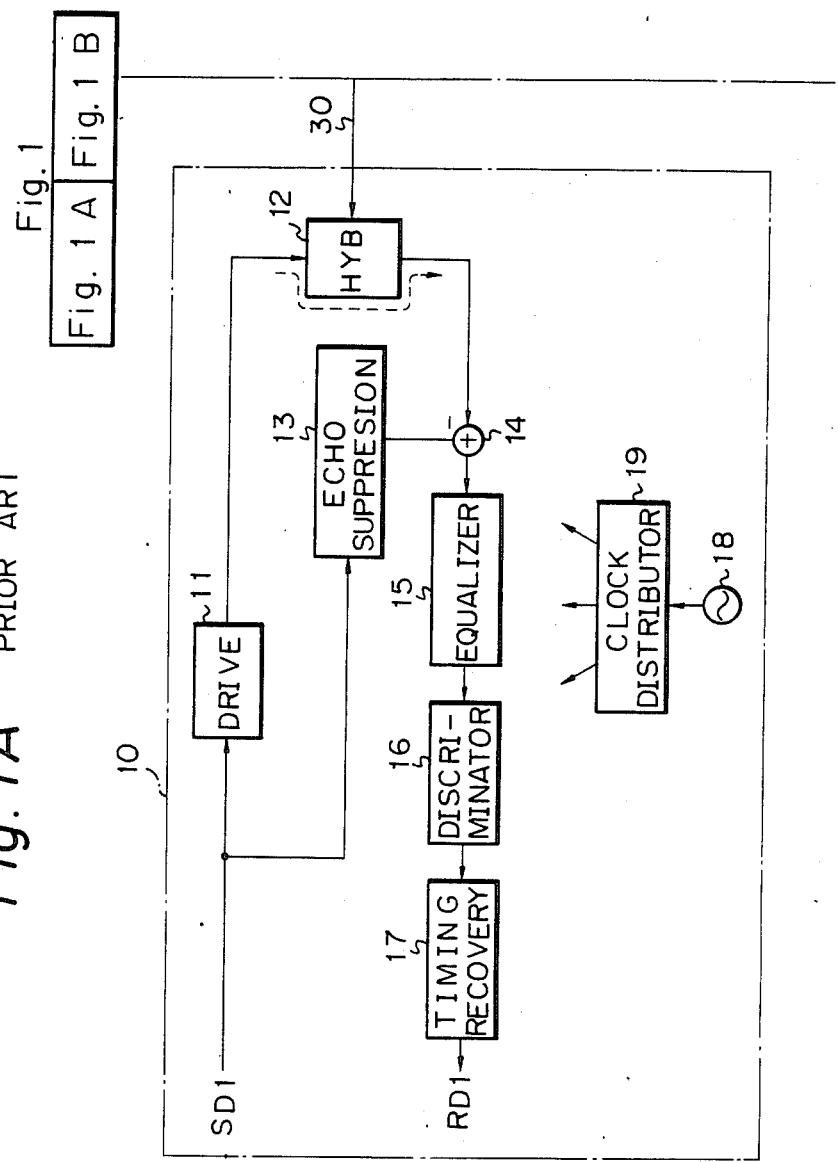
Fig. IA  PRIOR ART

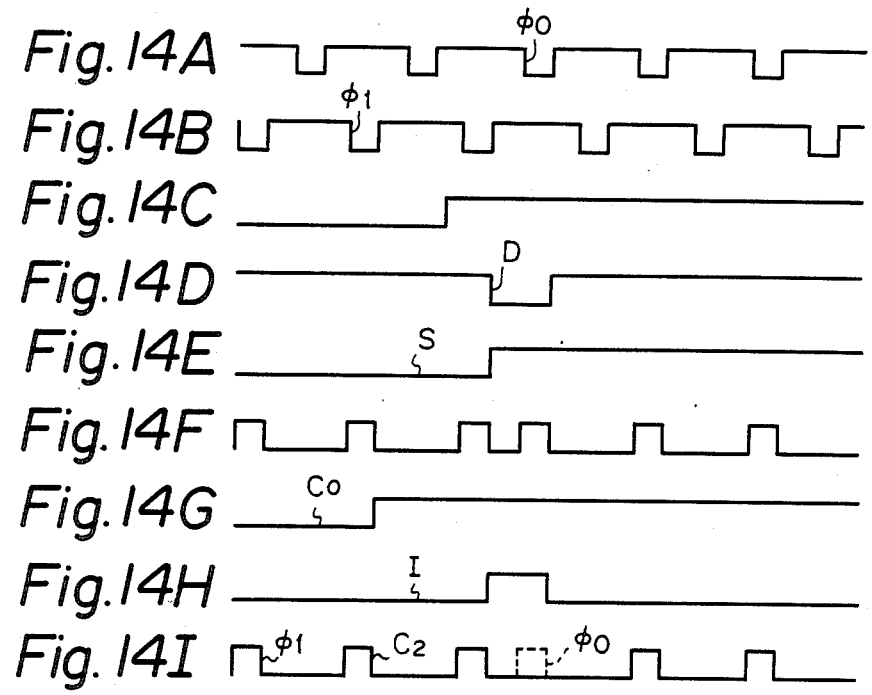
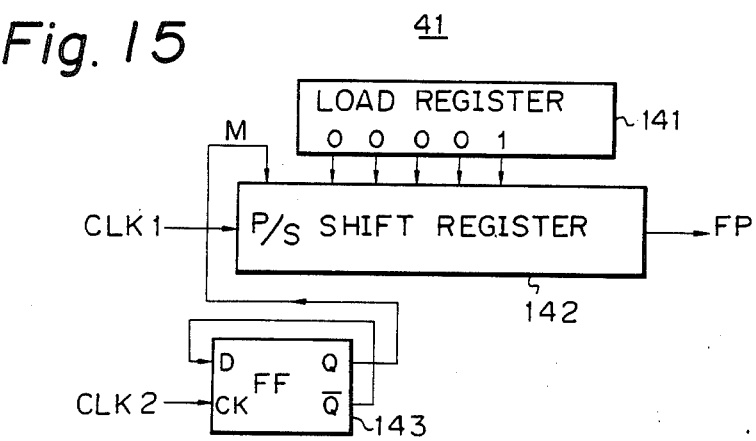

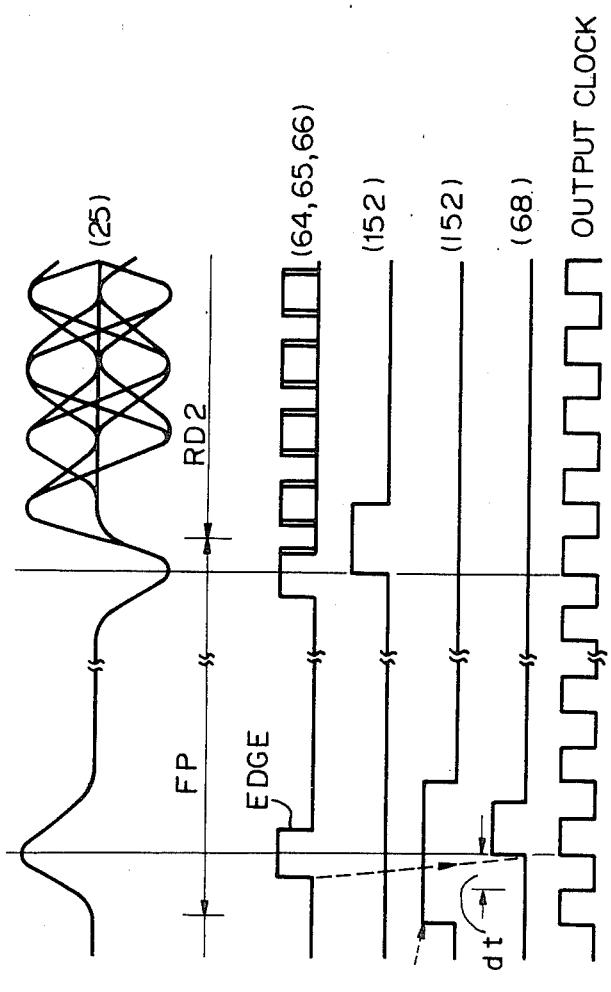

DIGITAL TRANSMISSION SYSTEM

BACKGROUND OF THE INVENTION

1. Field of the Invention

The present invention relates to a digital transmission system. More particularly, it relates to a digital transmission system employed, for example, in an integrated service digital network (ISDN) for transmitting data via a single transmission line using a full duplex communication mode.

2. Description of the Related Art

In a known digital transmission system operated using the full duplex communication mode, a highly accurate timing recovery operation must be achieved to maintain good quality transmission data, and echo must be completely suppressed for the same reason. The above-mentioned second requirement is especially pertinent to a digital transmission system operated under an echo suppression method (or echo cancellation method), but is not so important in a digital transmission system operated under a time compression method, i.e., the so-called ping-pong method. This is because, in the ping-pong method, a signal sent from a transmitter unit in a transmitting-receiving unit cannot inherently leak into a receiver unit in the same unit, as it can in the echo suppression method.

Namely, in the above digital transmission system, interference in the timing recovery operation is usually caused by an echo signal originating from a signal output by that system, and interference in the echo suppression operation is usually caused by a signal received from a remote transmitting-receiving unit.

In the prior art transmitting-receiving unit, a method for maintaining the high quality of transmission data is directed only to a reduction of the echo signal to a level as low as possible, to attain a more accurate timing recovery. For example, the related echo suppression circuit (often called an echo cancellation circuit, but hereinafter referred to as an echo suppression circuit) works using an that drives the echo signal to a level of almost zero at each sampling point. In this case, even though at each sample point echo signal level is reduced to nearly zero, the remaining non sampled portions of the echo signal, which have not been sampled, are left as they are, i.e., at a relatively high level. Thus, non-sampled portions of the echo signal often reach a level as high as the levels of the received signals. Under such circumstances, it is very difficult for the related timing recovery circuit to achieve a really accurate timing recovery operation, since the received signals used for that operation contain undesired non-sampled echo signal components.

Consequently, the problems occurring in the prior art are, first, a large number of sampling points must be used, and second, the timing recovery circuit must be operated in accordance with a complicated algorithm. The above mentioned first and second methods are not suitable for practical and commercial use from an economical viewpoint.

SUMMARY OF THE INVENTION

Accordingly, an object of the present invention is to provide a digital transmission system, operated using a full duplex communication mode and an echo suppression method, in which a highly accurate timing recovery operation can be performed without employing special hardware or using a special algorithm. A further object of the present invention is to achieve a complete echo suppression operation in the system without employing special hardware or using a special algorithm.

To attain the above objects, a digital transmission system according to the present invention incorporates at least timing control means and transmission control means: the timing control means being operative to synchronize an internal clock of a transmitting-receiving unit with a received signal applied thereto during every predetermined period; and the transmission control means being operative to inhibit the issuance of a send signal from the transmitting-receiving unit.

BRIEF DESCRIPTION OF THE DRAWINGS

The above objects and features of the present invention will be more apparent from the following description of the preferred embodiments with reference to the accompanying drawings, wherein:

FIGS. 14A to 14I depict timing charts for explaining the operation of the circuit shown in FIG. 13;

FIG. 15 is a detailed example of the frame pulse generator;

FIGS. 17A through 17F depict waveforms of signals appearing in FIG. 16 at the portions A through F, respectively.

DESCRIPTION OF THE PREFERRED EMBODIMENTS

Before describing the embodiments of the present invention, the technical background thereof and problems in the prior art will be first described with reference to the related figures. Further, for ease of comprehension, the following explanations will be primarily made on the basis of an integrated service digital network (ISDN).

Figure 1B:
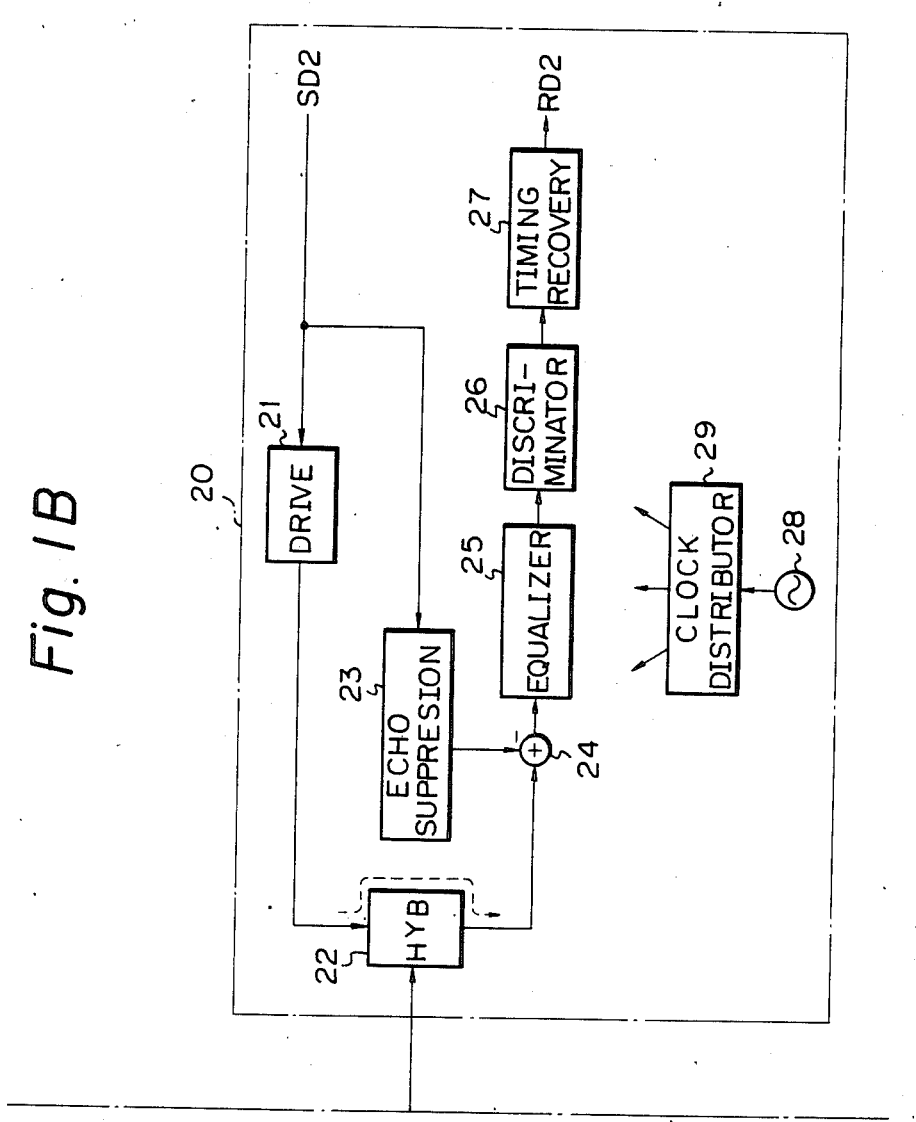
FIG. 1 is a general block diagram of a conventional digital transmission system to which the present invention pertains.

FIG. 1 is a general block diagram of a conventional digital transmission system to which the present invention pertains. In FIG. 1, the basic construction of the system includes a master side transmitting-receiving (T/R) unit 10 and a slave side T/R unit 20 connected thereto by a single two-wire transmission line 30. The master side T/R unit 10 is mounted in an exchange office and includes therein a master clock source 18. The master clock is supplied to respective circuits via a clock distributor 19. The slave side T/R unit 20 is mounted on a subscriber side and includes therein a slave clock source 28. The slave clock is supplied to respective circuits via a clock distributor 29. In this case the slave clock is subordinate to the master clock.

When send data SD1 is to be supplied by the T/R unit 10 to the T/R unit 20, the send data SD1 in the T/R unit 10 is applied to a hybrid transformer 12 via a drive circuit 11, where a four-wire to two-wire conversion is established to form a connection with the transmission line 30 and the send data SD1 is then transmitted, as a send signal, to the slave side T/R unit 20.

It should be understood here that there are many separate T/R unit pairs linked between the exchange office and the subscribers via individual transmission lines.

Conversely, when send data SD2 from the slave side T/R unit 20 is to be transmitted via the transmission line 30 and applied to the master side T/R unit 10, the signal received signal at the master side T/R unit 10 is input, via the hybride transformer 12, to a subtractor 14. The substractor 14 cooperates with an echo suppression circuit 13 to suppress any echo signal superimposed on the received signal. As is well known, the echo signal is a part of the send signal leaked via the hybrid transformer 12, along the path shown by a broken line arrow in FIG. 1, due to a mismatching in impedance at the hybrid transformer 12 with respect to the transmission line 30. Therefore, the echo signal can be suppressed in a receiver part of the T/R unit 10 by applying, from a transmitter part thereof, the send signal (SD1) to the subtractor 14 by way of the echo suppression circuit 13, which matches the send signal level with the leakage send signal level via the hybrid transformer 12. Therefore, theoretically, the received signal supplied from the subtractor 4 contains no echo signal. The received signal is then applied to an equalizer 15 to compensate for various distortions imparted to the received signal transmitted along the line 30. The thus equalized signal is applied to a discriminator 16 to obtain logic "1" and "0" signals. The "1" and "0" signals are supplied to a timing recovery circuit 17 to extract therefrom a clock component and then reproduce the send data SD2 as the received data RD1, by sampling the "1" and "0" signals with the use of the extracted clock component. The above-mentioned operations are also applied to the slave side T/R unit 20 when the signal SD2 is transmitted and a signal RD2 is received.

Figure 2A:
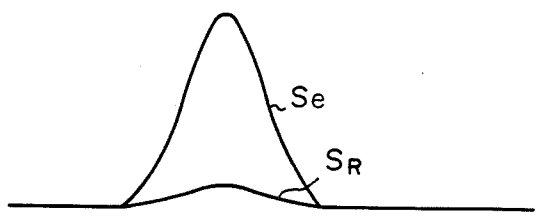
FIGS. 2A, 2B, 2C, and 2D depict waveforms of signals for explaining an echo suppression circuit.
Figure 2B:
Figure 2C:
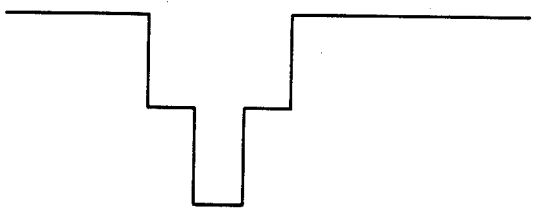
Figure 2D:
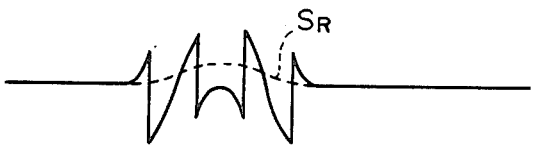

FIGS. 2A, 2B, 2C, and 2D depict waveforms of signals for explaining the echo suppression circuit 13. FIG. 2A depicts the echo signal applied to the echo suppression circuit 13 (which is the same as for a echo suppression circuit 23). The echo signal $S_e$ is sampled with a sampling signal $S_P$, shown in FIG. 2B, to produce a so-called replica. The replica is negatively added to the echo signal leaked from the hybrid transformer 12 at the subtractor 14 to obtain the zigzag-shaped signal shown in FIG. 2D. In FIGS. 2D and 2A, the curve $S_R$ represents the received signal. As is apparent from FIG. 2D, the echo signal is suppressed to zero only at each sampling point, but left as it is at portions other than these sampling points, and the thus unsuppressed echo signal impedes correct timing recovery.

A similar problem to that mentioned above is also raised during the echo suppression operation. The echo suppression circuit 13 (which is the same as for the echo suppression circuit 23) is made of, for example, a known transversal type filter provided with taps for determining coefficients. The tap coefficients are adaptively determined in accordance chiefly with the degree of the mismatching in impedance at the hybrid transformer 12 with respect to the transmission line 30. In this case, however, it is difficult to correctly determine such value of the tap coefficients, since a mixture of the echo signal and the recieved signal (not the echo signal only), is used for the determination.

Figure 3:
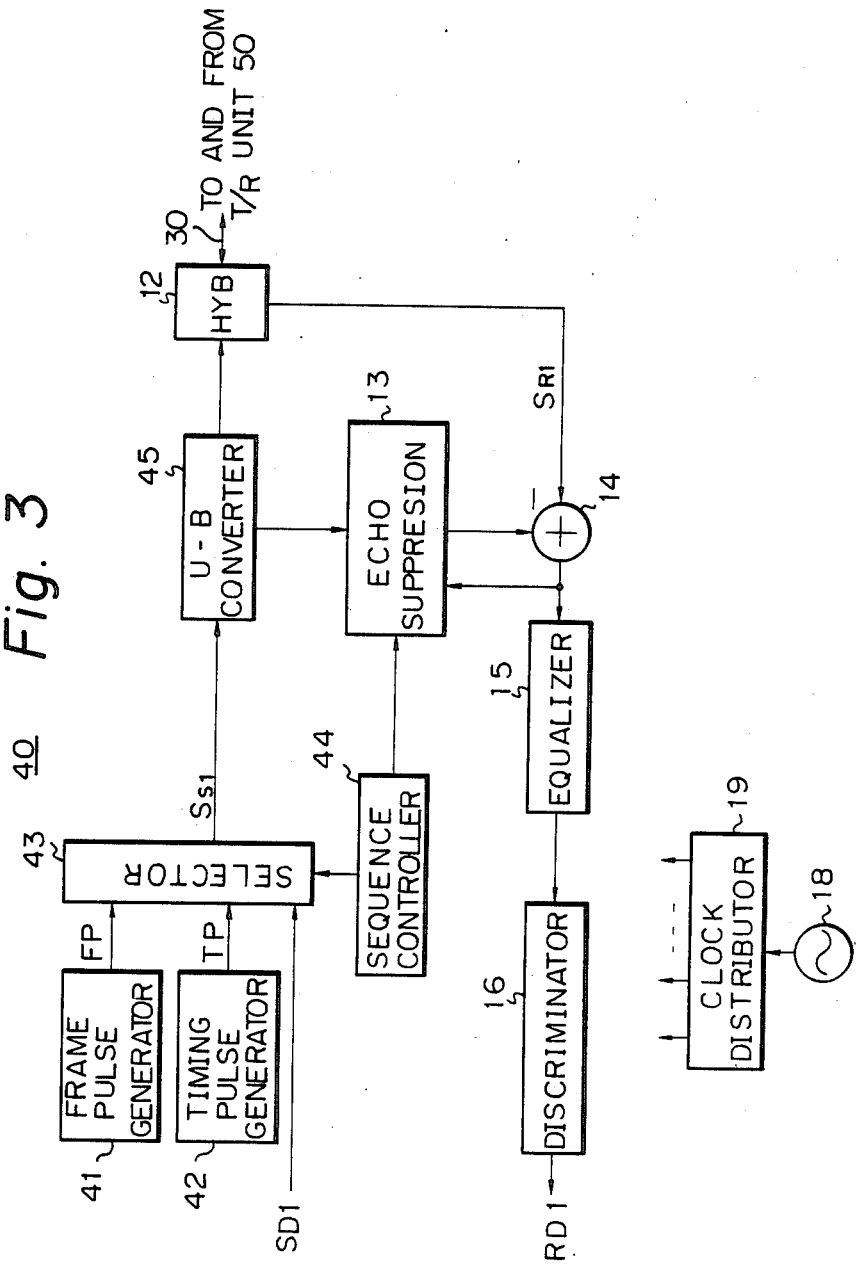
FIG. 3 is a block diagram of a master side transmitting-receiving unit according to a first embodiment of the present invention.
Figure 4:
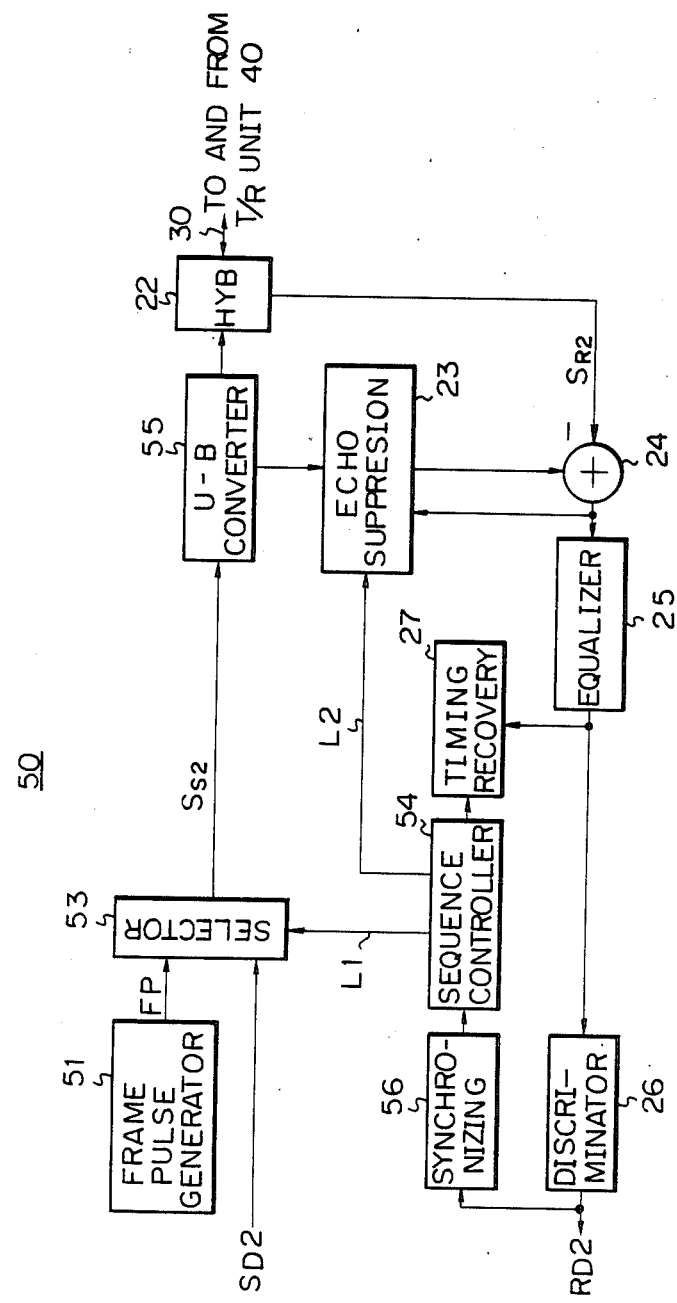
FIG. 4 is a block diagram of a slave side transmitting-receiving unit according to a first embodiment of the present invention.
Figures 5A, 5B, 5C, 5D:
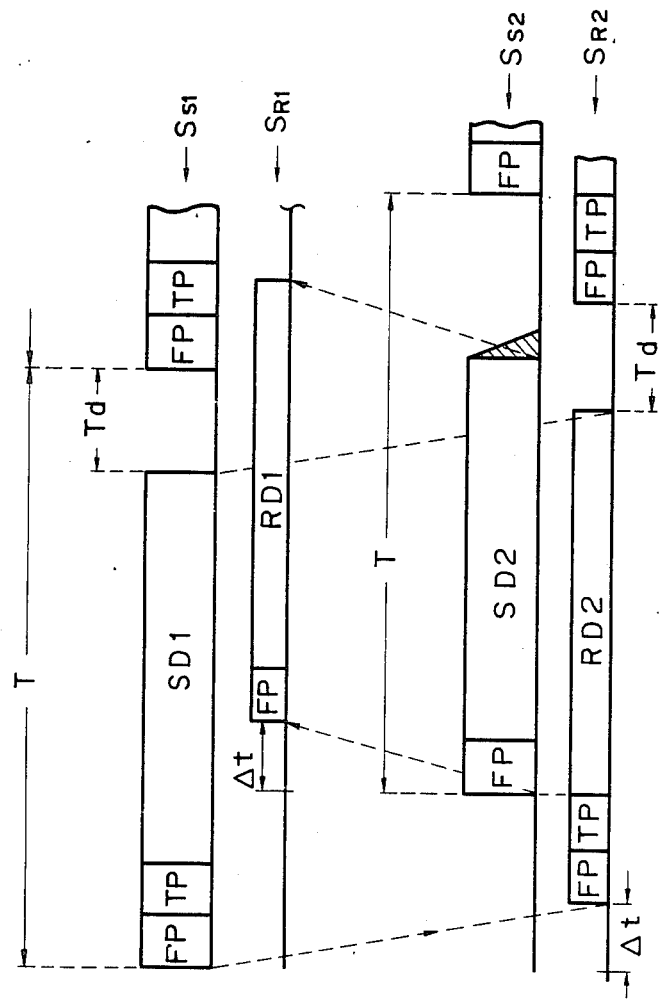
FIGS. 5A, 5B, 5C, and 5D depict timing charts of signals appearing in the units shown in FIGS. 3 and 4.

FIG. 3 is a block diagram of a master side transmitting-receiving unit according to a first embodiment of the present invention. In FIG. 3, members identical to those of previous figures are represented by the same reference numerals or symbols (which is the same as for later figures). FIG. 4 is a block diagram of a slave side transmitting-receiving unit according to a first embodiment of the present invention. FIGS. 5A, 5B, 5C, and 5D depict timing charts of signals appearing in the units shown in FIGS. 3 and 4. FIGS. 5A and 5B depict the send signal $S_{S1}$ and the received signal $S_{R1}$, both at the master side, respectively. Similarly, FIGS. 5C and 5D depict the send signal $S_{S2}$ and the received signal $S_{R2}$, both at the slave side, respectively.

The operation for transmitting data from the master side transmitting-receiving (T/R) unit 40 will be explained below with reference to FIGS. 3 and 5A. The T/R unit 40 produces a send signal $S_{S1}$ composed of successive frames each having a period T. One of these frames is illustrated in FIG. 5A. The frame is set up by containing a frame pulse FP, a timing pulse TP, and the send data SD1, in this order. The frame pulse FP is generated by a frame pulse generator 41. The timing pulse TP is generated by a timing pulse generator 42. The frame pulse FP, the timing pulse TP, and the send data SD1 are selected one by one sequentially at a selector 43 to produce therefrom the send signal $S_{S1}$. The selection is made by a sequence controller 44. The sequence controller 44 also controls the selector 43 to create a non-signal duration period $T_d$. Thus the selector 43 and the sequence controller 44 form transmission control means. The thus set up send signal $S_{S1}$ is applied to the hybrid transformer 12 via a unipolar-bipolar (U-B) converter 45 and the above-mentioned drive unit (not shown).

In the master side T/R unit 40, the above-mentioned timing recovery circuit is not incorporated therein because the timing recovery operation is not always necessary, since the T/R unit 40 has its own master clock source 18 and the master clock is supplied to each circuit via the clock distributor 19. In actuality, however, although the timing control for the frequency is not always necessary, the timing control for the phase preferably should be performed. This is because a transmission delay is not constant but slightly variable, due to various factors such as a change in temperature, a change in characteristics due to an elapse of a long term period, and so on.

The send signal $S_{S1}$ is thus produced from the master side T/R unit 40 and transmitted, via the transmission line 30, to the slave side T/R unit 50 of FIG. 4 with a certain delay time $\Delta t$ (FIG. 5D). The thus received signal $S_{R2}$ is depicted in FIG. 5D. The signal $S_{R2}$ includes therein data to be reproduced later as the received data RD2. The content of RD2 is the same as that of SD1. It should be understood that the arrangement of the circuits in the slave side T/R unit of FIG. 4 is opposite relative to the arrangement of the circuits in the slave side T/R unit of prior art FIG. 1.

In the slave side T/R unit 50 of FIG. 4, the received signal $S_{R2}$ is applied, via a subtractor 24, an equalizer 25, and a discriminator 26, to a synchronizing circuit 56 in which an internal clock of the T/R unit 50 is synchronized with the received signal $S_{R2}$, in accordance with the frame pulse FP contained in the signal $S_{R2}$. Subsequently, a sequence controller 54 activates the timing recovery circuit 27 to extract the clock component from the received signal $S_{R2}$ in accordance with the timing pulse TP contained therein.

The sequence controller 54 then also controls the echo suppression circuit 23 and a selector 53. The selector 53 is controlled by the controller 54 to produce the send signal $S_{S2}$ composed of the successive frames; one of which is illustrated in FIG. 5C and set up with a frame pulse FP and the send data SD2 in the given order. The fram pulse FP is generated by a frame pulse generator 51. The controller 54 also controls the selector 53 so that a non-signal duration period is created during in the period T. Thus the selector 53 and the sequence controller 54 form both a timing control means and a transmission control means. The thus set up send signal $S_{S2}$ is applied to the hybrid transformer 22 via a unipolar-bipolar (U-B) converter 55 and the above-mentioned drive unit (not shown).

The send signal $S_{S2}$ is thus produced from the slave side T/R unit 50 and transmitted via the transmission line 30, to the master side T/R unit 40 of FIG. 3 with a certain delay time $\Delta t$ (FIG. 5B). The thus received signal $S_{R1}$ is depicted in FIG. 5B. This signal $S_{R1}$ includes therein the data to be later reproduced as the received data RD1. The content of RD1 is the same as that of SD2. That is the received signal $S_{R1}$ is applied to the subtractor 14, the equalizer 15, and the discriminator 16, so that the received data RD1 is obtained.

The point is that the transmission control means, e.g., the selector 43 and the sequence controller 44 on the master side, operate in such a manner as to insert the timing pulse TP in each frame having the period T, while, on the slave side, the transmission control means, e.g., the selector 53 and the sequence controller 54, operates to inhibit an issue of the send signal $S_{S2}$ and at the same time, on the slave side, the timing control means, e.g., the sequence controller 54, controls the timing recovery circuit 27 to start the related timing recovery operation only during the inhibition of the issuance of the send signal $S_{S2}$. Accordingly, in the slave T/R unit 50, it is possible to perform the timing recovery with the use of the received signal only, in the form of the timing pulse TP, without an echo signal being generated inside the T/R unit 50. This means that a stable and accurate timing recovery operation can be carried out.

Figure 6:
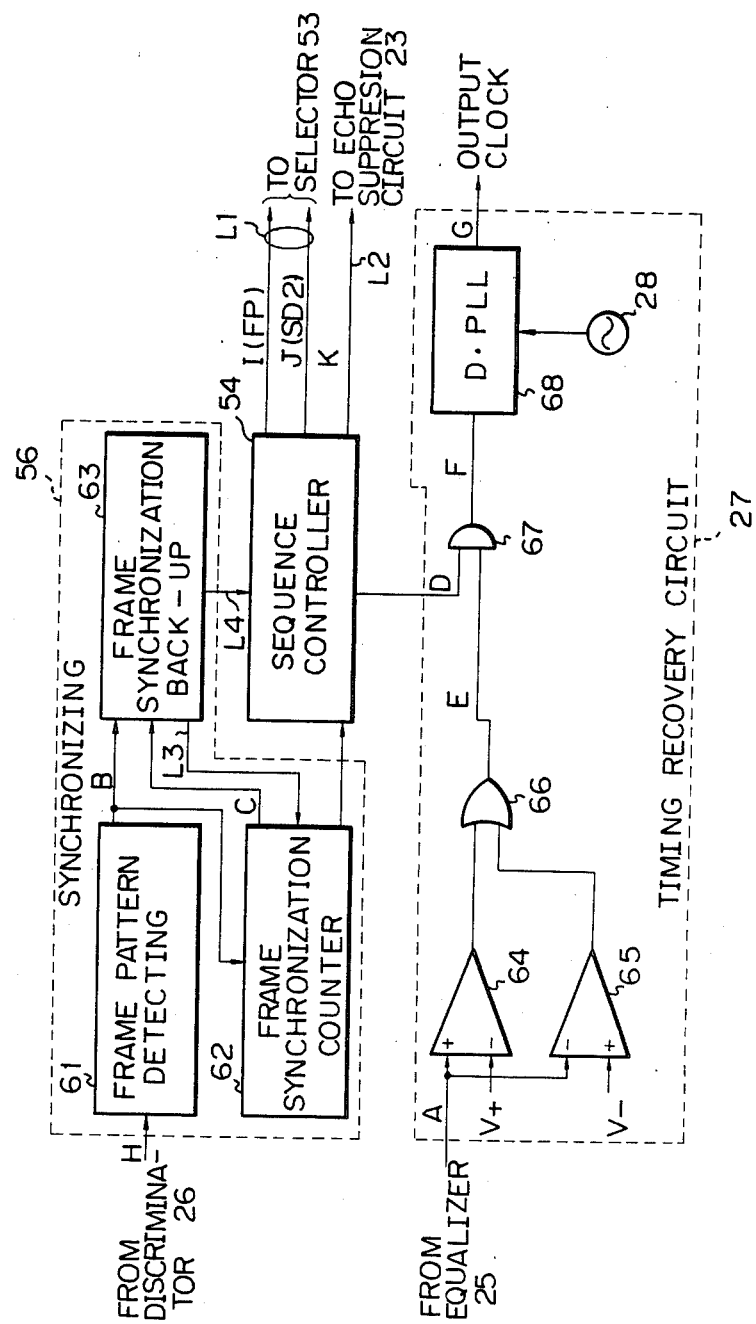
FIG. 6 illustrates a more detailed example of the synchronizing circuit and the timing recovery circuit in cooperation with the sequence controller shown in FIG. 4.

FIG. 6 illustrates a more detailed example of the synchronizing circuit and the timing recovery circuit in cooperation with the sequence controller 54 shown in FIG. 4. FIGS. 7A through 7K depict the waveforms appearing at the portions A through K shown in FIG. 6, respectively. The synchronizing circuit 56 is comprised of a frame pattern detecting circuit 61, a frame synchronization counter 62, and a frame synchronization back-up circuit 63. The timing recovery circuit 27 is comprised of an upper side comparator 64, a lower side comparator 65, an OR gate 66, an AND gate 67, a digital phase-locked loop (D-PLL) circuit 68, and the above-mentioned slave clock source 28.

Figure 7:
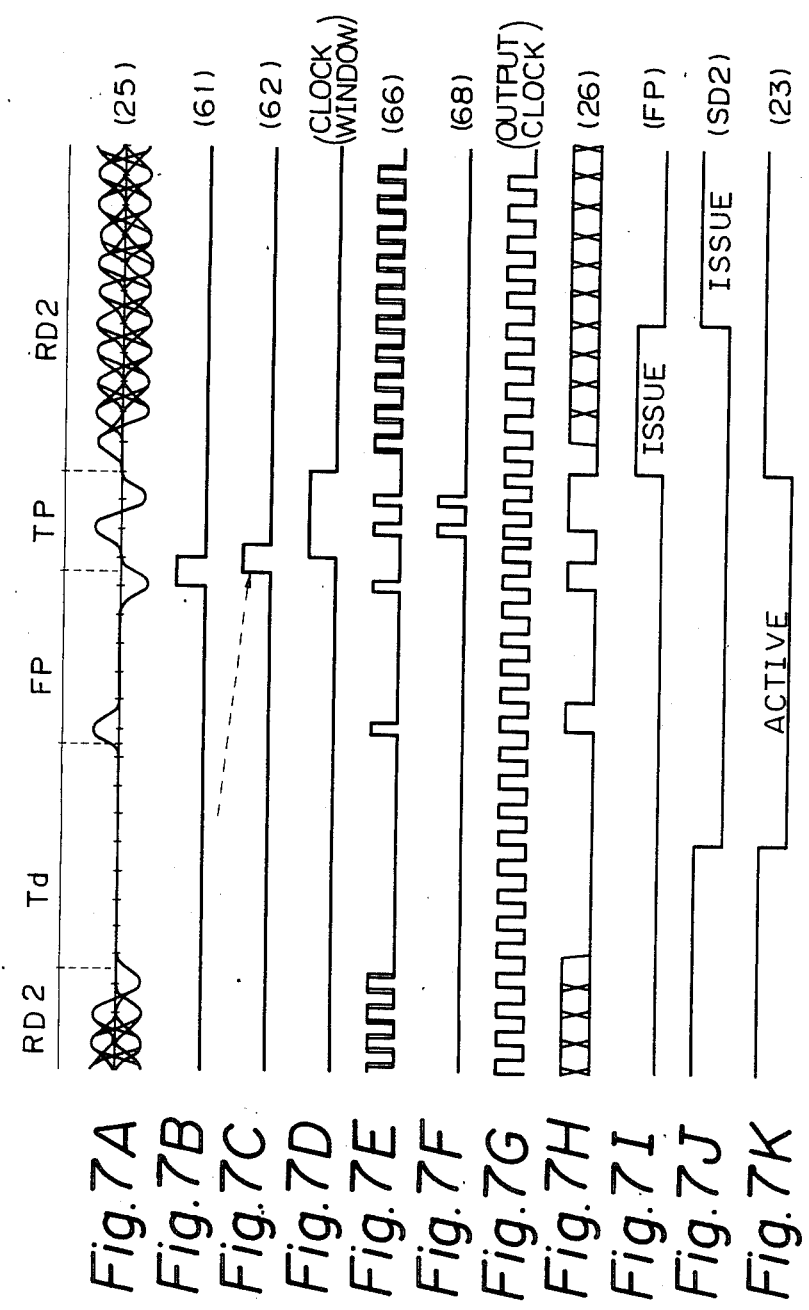
FIGS. 7A through 7K depict waveforms appearing at the portions A through K shown in FIG. 6, respectively.

The discriminator 26 of FIG. 4 produces the discriminated logic "1" and "0" signals, which appear at the portion H in FIG. 6. These signals have the waveform as shown in FIG. 7H in response to the waveforms of FIG. 7A representing the above-mentioned signals RD2, FP, and TP. The signal at the portion H is input to the frame pattern detecting circuit 61 by which the frame pattern, including the frame pulse FP, is detected. When the frame pattern is detected, a detection output is produced therefrom having the waveform of FIG. 7B and applied to both the frame synchronizing back-up circuit 63 and the frame synchronization counter 62, to start the related counting operation. When the counter 62 completes the counting to a predetermined count number, it produces a end pulse appearing at the portion C having the waveform of FIG. 7C. The end pulse is applied to the circuit 63. The predetermined count number is, for example, "160" or "168" which corresponds to the bit number in each frame having the period T.

The frame synchronization back-up circuit 63 determines whether or not frame pulse detection is established. Specifically, when the circuit 63 receives the detection outputs from the circuit 61 several times in succession, the circuit 63 determines that the frame synchronization is correctly established. Soon after this, the circuit 63 sends a command, via a line L3, to the counter 62 for starting the counting operation. The correct establishment of frame synchronization is communicated, via a line L4, to the sequence controller 54. Then the controller 54 is activated. The controller 54 preferably can be a read only memory (ROM) which stores therein various data specifying the related control sequence written thereinto in advance. That is, the controller 54 issues command signals, at the portions I, J, and K, on lines L1 and L2, both shown also in FIG. 4. The command signals at the portion I and J are applied to the selector 53 with the waveform of FIGS. 7I and 7J, respectively. The command signal at I indicates the start of issuance of the frame pulse FP, and the command signal at J indicate the start of of the send data SD2. Before the issuance of FP and SD2, the command signal at K is applied to the echo suppression circuit 23 (FIG. 4) for activating the same to adjust the tap coefficients adaptively at $T_d$. In accordance with the above-mentioned sequence control by the controller 54, the slave side T/R unit 50 can achieve the timing recovery operation with the use of the transmitted timing pulse TP and without generating an echo signal which would, if generated, impede establishment of an accurate timing recovery, as mentioned previously. To do this, the sequence controller 54 produces a clock window signal appearing at the portion D with the waveform of FIG. 7D and applies it to the AND gate 67 to open the same.

On the other hand, the output from the equalizer 25 is applied to the comparators 64 and 65 at the portion A and compared in level with reference voltages $V_{30}$ and $V_-$ independently. The upper and lower side comparators 64 and 65 are responsible for the positive and negative pulses of the bipolar output shown in FIG. 7A, respectively. Theoretically, either one of these comparators can derive the clock component. In actuality, however, two comparators are preferable to obtain a larger (two times) number of compared outputs than that obtained with the single comparator. The compared outputs from the comparators 64 and 65 are OR'ed at the OR gate 66 and the resultant output at the portion E is applied to the above-mentioned AND gate 67, which output has the waveform of FIG. 7E. Among many clock components from the comparators 64 and 65, only the clock component defined by the timing pulse TP is selectively extracted by the clock window signal (D) at the AND gate 67. The thus extracted clock component cannot be influenced by the echo signal, since the send data SD2 causing the echo signal is not transmitted until the timing pulse duration period has elapsed. This means that a pure clock component is supplied from the AND gate 67, and accordingly, the D·PLL circuit 68 is driven by the pure clock component derived from the received signal. Thus, the slave clock from the slave clock source 28 is subordinated in synchronization to the received signal $S_{R2}$. In other words, the internal clock of the slave side T/R unit 50 is synchronized with the received signal $S_{R2}$, so that a pulled-in output clock appears at the portion G. The above-mentioned said sampling makes it easier to simplify the construction of the echo suppression circuit 23 than in the usual echo suppression circuit, since the echo suppression circuit 23 is controlled with the use of the related echo signal only during the non-signal duration period $T_d$ shown in FIG. 5D, in which no received signal $S_{R2}$ exists but only the echo signal caused by the send signal $S_{S2}$ exists. The received non-signal duration period $T_d$ of FIG. 5D is the same as the transmitted non-signal duration period $T_d$ of FIG. 5A. The non-signal duration period $T_d$ is determined such that the next transmitted pulses FP and TP can be received at the slave side after the trailing edge of the skirt made with the echo signal (refer to the hatched area in FIG. 5C) induced by the send data SD2.

It should be noted that the master side T/R unit 40 can also perform the timing recovery, if necessary. In this case, the timing recovery operation should be achieved during the non-signal duration period $T_d$ of FIG. 5A. This is because the duration period $T_d$ contains no echo signal induced by the send data SD1, but only the received signal $S_{R1}$. Therefore, the timing recovery in the master side T/R unit 40 can also be performed stably and accurately.

Furthermore, it should be noted that, in the slave side T/R unit 50 of FIG. 4, the training pulse (TP) period duration can be utilized for performing line equalization by the equalizer 25. The echo signal also causes a deterioration in the line equalization. Therefore, it is preferable to achieve the line equalizing operation in the non-single duration period. $T_d$, since no such deleterious echo signal exists in the duration period. $T_d$, and thus a stable and adaptive line equalization can be realized.

Figure 8:
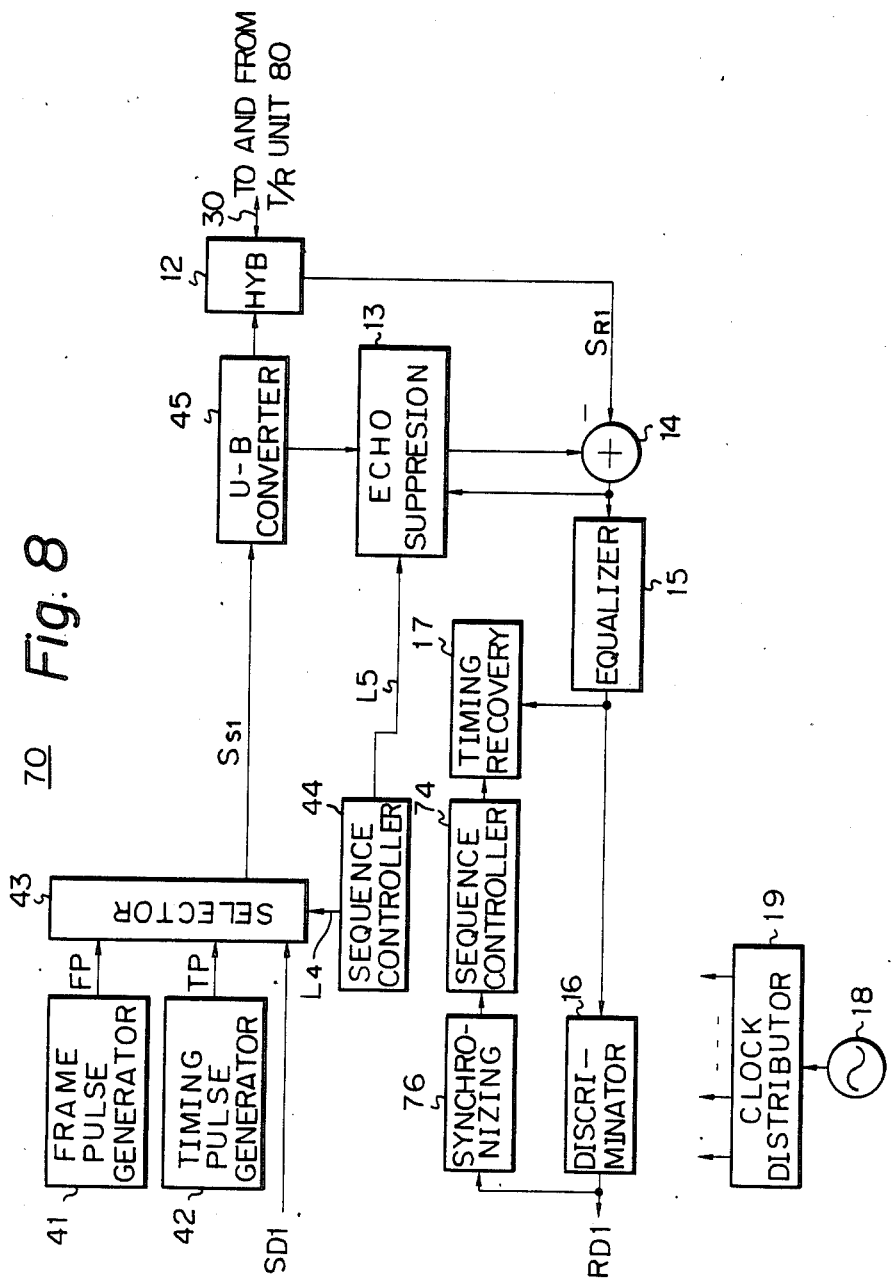
FIG. 8 is a block diagram of a master side transmitting-receiving unit according to a second embodiment of the present invention.
Figure 9:
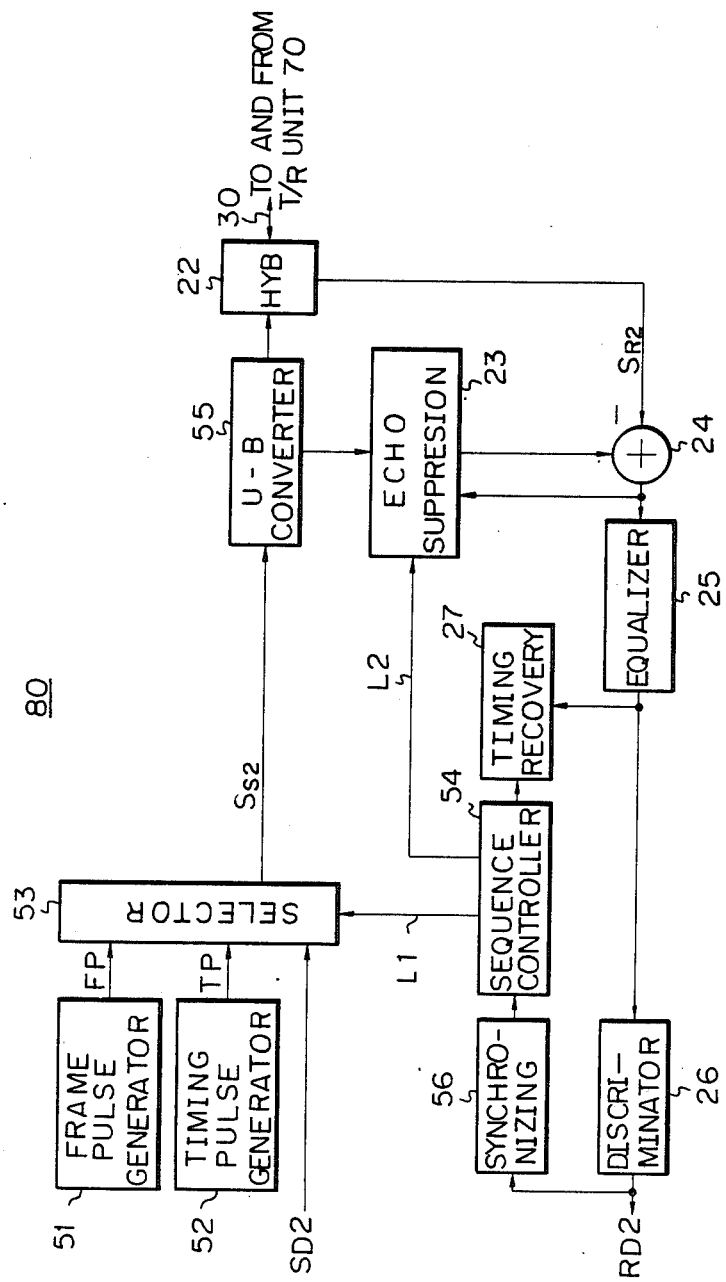
FIG. 9 is a block diagram of a slave side transmitting-receiving unit according to a second embodiment of the present invention.
Figure 10:
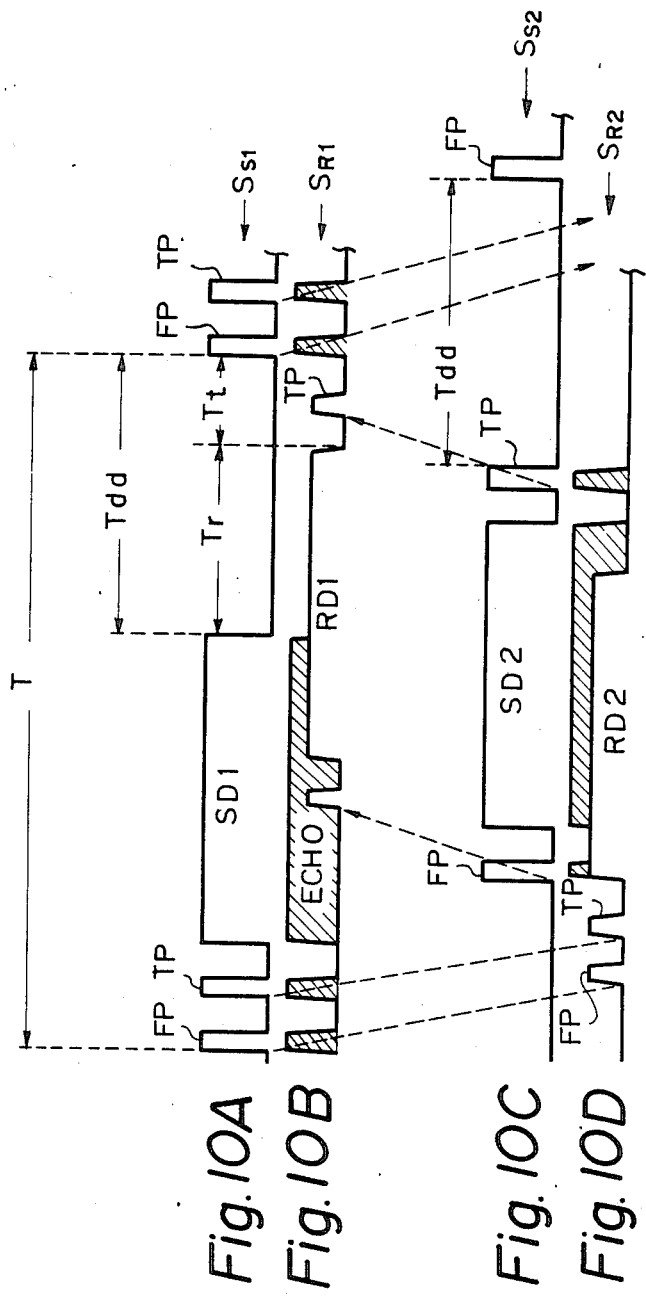
FIGS. 10A, 10B, 10C and 10D depict timing charts of signals appearing in the units shown in FIGS. 8 and 9.

FIG. 8 is a block diagram of a master side transmitting-receiving unit according to a second embodiment of the present invention. FIG. 9 is a block diagram of a slave side transmitting-receiving unit according to a second embodiment of the present invention. FIGS. 10A, 10B, 10C, and 10D depict timing charts of signals appearing in the units shown in FIGS. 8 and 9. FIGS. 10A through 10D correspond to FIGS. 5A through 5D, respectively. That is, FIGS. 10A and 10B depict send signal $S_{S1}$ and the received signal $S_{R1}$, both at the master side, respectively. Similarly, FIGS. 10C and 10D depict the send signal $S_{S2}$ and the received signal $S_{R2}$, both at the slave side, respectively. It should be understood that the frame pulse FP and the timing pulse TP are not illustrated integrally as one piece in FIGS. 10A through 10D, as shown in FIGS. 5A through 5D. This difference in illustration is not important, but merely for facilitating an understanding of the echo signals illustrated with hatchings.

The operation for a transmission from the master side T/R unit 70 will first be explained below with reference to FIGS. 8 and 10A. The members 76 and 74 are substantially the same as the synchronizing circuit 56 and the sequence controller 54 (both shown in FIG. 4), respectively. The frame pulse generator 41, the timing pulse generator 42, the selector 43, and the sequence controller 74 cooperate with each other to produce the send signal $S_{S1}$ shown in FIG. 10A, as in the first embodiment of FIG. 3 with the corresponding members 41, 42, 43, and 44. That is, the frame pulse FP, the timing pulse TP and the send data SD1 are set up or combined, as the send signal $S_{S1}$, in this order. Further, a non-signal duration period $T_{dd}$ is also created in the period T of each frame. The difference between the duration period $T_{dd}$ of FIG. 10A and the corresponding duration period $T_d$ of FIGS. 5A and 5D is that, in the second embodiment, the duration period $T_{dd}$ is composed of two successive durations period $T_r$ and $T_t$. The duration. $T_r$ is determined to be equal to twice the transmission delay time of the transmission signal from the master side unit to the slave side unit and vice versa. The duration period $T_t$ is determined to allow enough time to accept the timing pulse TP transmitted from the slave side T/R unit 80. The thus set up or combined send signal $S_{S1}$ is transmitted, via the unipolar-bipolar converter 45, the hybrid transformer 12, and the transmission line 30, to the slave side T/R unit 80. At this time, the echo signal, induced by the signal $S_{S1}$, leaks into the same side receiver part, as mentioned previously. In the present invention the thus induced echo signal is used for adaptively adjusting the echo suppression circuit 13, especially with the use of the echo signal derived from at least the timing pulse TP (first occurrence in FIG. 10A) by means of the sequence controller 74 which controls, on the one hand, the selector 43 to produce the timing pulse TP, and on the other hand, controls the echo suppression circuit 13 to start adaptive adjustment for suppressing the echo signal. It should be recognized that the adaptive adjustment can be carried out with a high degree of accuracy, since the echo suppression circuit 13 is no longer influenced by any received signal $S_{R1}$ supplied from the slave side T/R unit 80.

The send signal $S_{S1}$ from the master side T/R unit 70 reaches the slave side T/R unit 80 with a certain delay time (equal to $T_r/2$) and is received thereby as the received signal $S_{R2}$ with the waveform shown in FIG. 10D. The signal $S_{R2}$ is applied, via the subtractor 24, the equalizer 25, and the discriminator 26, to the synchronizing circuit 56 in which the internal clock of the T/R unit 80 is synchronized with the received signal $S_{R2}$, in accordance with the frame pulse FP contained in the signal $S_{R2}$. Then, with the use of the thus synchronized internal clock, the sequence controller 54 is activated to control the selector 53 such that, as shown in FIG. 10C, the frame pulse FP (first occurrence), the send data SD2, and the timing pulse TP are produced in this order. The pulses FP and TP are generated by the respective generators 51 and 52 and produced, together with the send data SD2, one by one under control of the controller 54. Also, the non-signal duration period $T_{dd}$ (FIG. 10C) is created. The duration period $T_{dd}$ is identical to the duration period $T_{dd}$ of FIG. 10A, and thus, is composed of the durations $T_r$ and $T_t$. The thus formed send signal $S_{S2}$ is transmitted, via the transmission line 30, to the master side T/R unit 70, and at the same time, the echo signal, induced by the send signal $S_{S2}$, leaks into the own side receiver part with the waveform with a hatchings as illustrated in FIG. 10D. In this case, the adaptive adjustment of the echo suppression circuit 23 is achieved by using the echo signal under the control of the sequence controller 54 every time the timing pulse TP of FIG. 10C is produced. Therefore, the circuit 23 is not influenced by a received signal $S_{R2}$, which no longer exists as shown in FIG. 10D.

The thus formed send signal $S_{S2}$ is transmitted, via the converter 55, the hybrid transformer 22, and the transmission line 30, to the master side T/R unit 70, with a certain transmission delay time (equal to $T_r/2$) from the slave side T/R unit 80 to the master side T/R unit 70.

The thus received signal $S_{RR1}$ (refer to FIG. 10B) at the master side T/R unit 70 is applied, via the subtractor 14, the equalizer 15, and the discrminator 16, to the synchronizing circuit 76 in which the internal clock of the T/R unit 70 is synchronized in phase with the received signal $S_{R1}$. Then, with the use of the thus synchronized internal clock in phase, the sequence controller 74 starts activating the timing recovery circuit 17 in order to establish a timing recovery, with the use of the received timing pulse TP shown in FIG. 10B. At this time, no echo signal exists in the master side T/R unit 70, which means that the timing recovery can be performed with a high degree of accuracy.

Alternatively, in the master side T/R unit 70, the timing recovery operation also can be achieved not only by using the training pulse TP (FIG. 10B), but also the received data (RD1) signal itself appearing in the duration period $T_r$ of FIG. 10A. This is because there is no echo signal in the duration period $T_r$. In this case, the use of the signal RD1 for timing recovery is possible under a condition that the bit amount of the signal RD1 is sufficient to achieve the timing recovery. In other words, the condition is that wherein the duration $T_r$ is relatively long, i.e., the slave side T/R unit 80 is located far from the master side T/R unit 70.

Further, in the slave side T/R unit 80, the timing recovery operation can be achieved with not only the received timing pulse TP of FIG. 10D, as in the above-mentioned way for achieving the same, but also the frame pulse FP of FIG. 10D. According to this method, the reliability of the timing recovery can be improved as compared to that of the above-mentioned way, with the use of the timing pulse TP only.

As mentioned above, in the second embodiment of the present invention, the timing recovery operation is achieved in not only the slave side T/R unit 80, but also in the master T/R unit 70, by means of the timing recovery circuits 27, both shown in FIGS. 8 and 9. In the previously explained first embodiment of the present invention, however, this timing recovery circuit is not incorporated in the master side T/R unit 40 (FIG. 3), but in the slave side T/R unit only as shown by the reference numeral 27 in FIG. 4. Therefore, the master side T/R unit according to the present invention is susceptible to phase deviation of the received signal $S_{S1}$ due to a change in the transmission characteristics of the transmission line 30. From this perspective, the first embodiment is inferior to the second embodiment. Contrary to this, however, the first embodiment is superior to the second embodiment from with respect to transmission efficiency, which is simply clarified by comparing the length of the non-signal duration period $T_d$ (FIG. 5A) in the first embodiment with that of the non-signal duration period $T_{dd}$ (FIG. 10A) in the second embodiment. This stems from the fact that, of course, each frame should deliver the send data in as large a size as possible, i.e., the non-signal period ($T_d$, $T_{dd}$) should be as short as possible.

Figure 11:
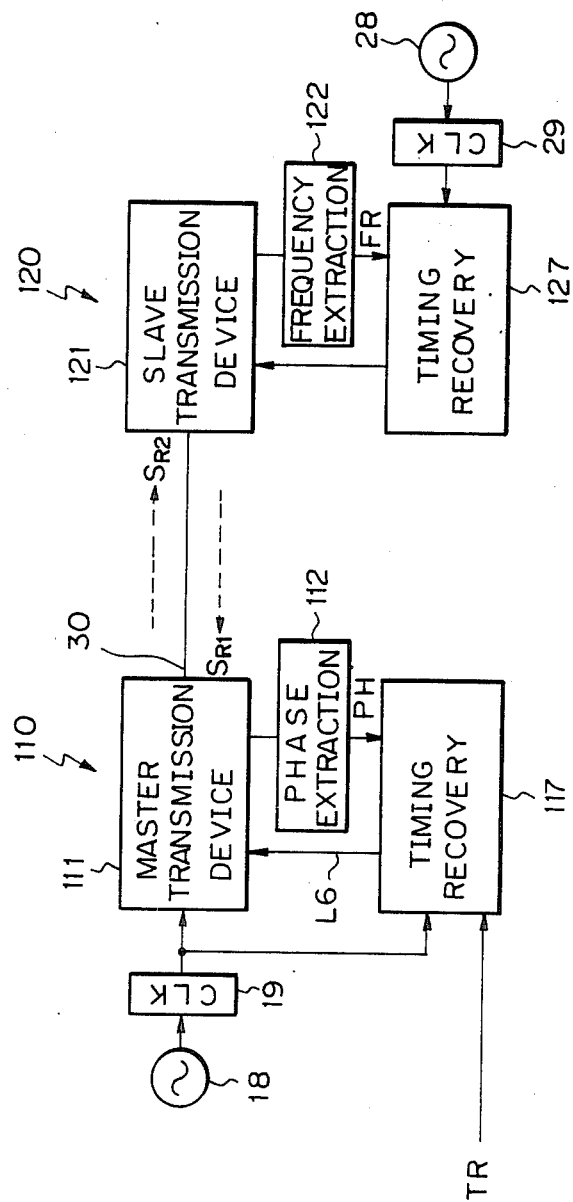
FIG. 11 is a general block diagram of a digital transmission system according to a modified first embodiment of the present invention.

FIG. 11 is a general block diagram of a digital transmission system according to a modified first embodiment of the present invention. The system is constructed with a master side (T/R) unit 110, a slave side T/R unit 120, and the transmission line 30. A block 111 represents a master side transmission device, i.e., all of the circuits comprising the T/R unit 40 of FIG. 3. A block 121 represents a slave side transmission device, i.e., all of the circuits comprising the T/R unit 50 of FIG. 4, other than timing recovery circuit 27. A block 112 represents a phase component extraction means, and a block 122 represents a frequency component extraction means. The basic functions of timing recovery circuits 117 and 127 are the same as those of the timing recovery circuits 17 and 27 shown in FIG. 1, respectively. The slave side T/R unit 120 is supplied with the received signal $S_{R2}$ and the frequency component FR is extracted from the signal $S_{R2}$ with the aid of the frequency extraction means 122. The frequency component FR is input to the timing recovery circuit 127 so as to synchronize the slave side internal clock (from the source 28) with the received signal $S_{R2}$ regarding both the frequency and the phase, whereby the timing recovery is performed. On the other hand, the master side T/R unit 110 is supplied with the received signal $S_{R1}$ applied from the slave side, and the phase component PH is then extracted from the signal $S_{R1}$ with the aid of the phase extraction means 112. The phase component PH is input to the timing recovery circuit 117 so as to synchronize the master side internal clock (from the source 18) with the received signal $S_{R1}$. It should be noted that the timing recovery operation in the circuit 117 is achieved only during a reception of a training signal TR. The training signal TR is used for initiating the timing recovery operation every time data transmission is to be started.

According to the modified first embodiment, first, the timing recovery operation is achieved in the slave side T/R unit 120 with the use of the received signal $S_{R2}$ supplied from the master side T/R unit 110, whereby timing recovery is performed with the use of the frequency component FR extracted by the means 122. In this case, the phase component necessarily is also extracted based on the frequency component. Thus, the recovered timing signal is obtained at the slave side T/R unit 120. Soon after this, a phase adjusting signal is returned to the master side T/R unit 110. The phase adjusting signal is synchronous with the thus recovered timing signal. The master side T/R unit 110 is supplied with the returned phase adjusting signal, so the timing recovery is started in the master side T/R unit 110 by using the same. It should be noted here that timing recovery in terms of the frequency at the master side T/R unit 110 is identical to that appearing at the slave side T/R unit 120. This is because the timing signal recovered at the slave side T/R unit 120 is derived from the received signal $S_{R2}$ supplied from the master side T/R unit 110. However, the timing signal regarding phase necessarily varies in accordance with the transmission characteristics. Therefore, in the master side T/R unit 110, the timing recovery is performed, not for the frequency component but for the phase component only, at the timing recovery circuit 117 with the aid of the phase extraction means 112.

Figure 12:
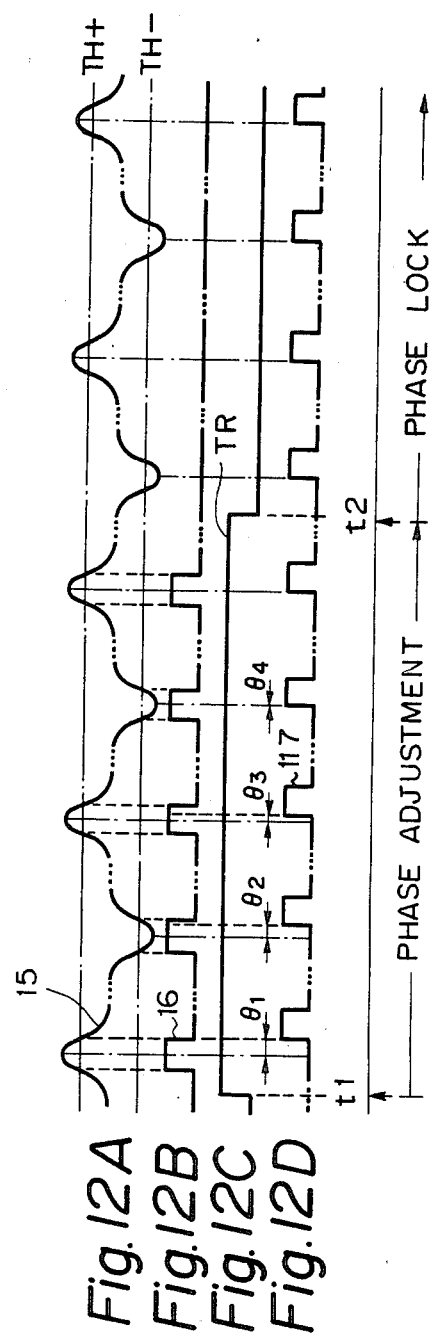
FIGS. 12A, 12B, 12C, and 12D depict waveforms of the signals for explaining the timing recovery performed in the master side transmitting-receiving unit.

FIGS. 12A through 12D depict waveforms of the signals for explaining the timing recovery performed in the master side T/R unit 110. The slave side T/R unit 120 is first supplied with the received signal $S_{R2}$ and then the phase adjusting signal is returned to the master side T/R unit 110, as the received signal $S_{R1}$. The signal $S_{R1}$ is applied to an equalizer identical to the equalizer 15 of FIG. 3, so that the equalized output is produced therefrom with the waveform 15 shown in FIG. 12A. The output is then applied to a discriminator identical to the discriminator 16 of FIG. 3, in which the output is compared with respect to level with positive and negative threshold levels $TH^+$ and $TH^-$, respectively. Thus, the compared output is obtained with the waveform 16 shown in FIG. 12B. As mentioned before, the training signal TR is used for initiating the timing recovery every time data transmission is to be started. The signal TR is shown in FIG. 12C. The signal TR is issued at the time t1 and ends at the time t2. In other words, the term from t1 to t2 exists for a phase adjustment. The timing recovery circuit 117 of FIG. 11 operates to adjust the phase so as to synchronize in phase the internal clock, i.e., the master clook (18), with the received signal $S_{R1}$ during the reception of the signal TR. The difference in phase therebetween gradually changes to zero, as schematically shown by $\theta_1 \rightarrow \theta_2 \rightarrow \theta_3 \rightarrow \theta_4$ in FIG. 12D.

When the training signal TR is stopped at the time t2, no further input is applied to the timing recovery circuit 117. Accordingly the phase in the circuit 117 is locked after the time t2 ("PHASE LOCK") with the phase adjusted immediately before the stoppage of the signal TR. Incidentally, an initial training operation is also achieved in the slave side, as in the master side.

Figure 13:
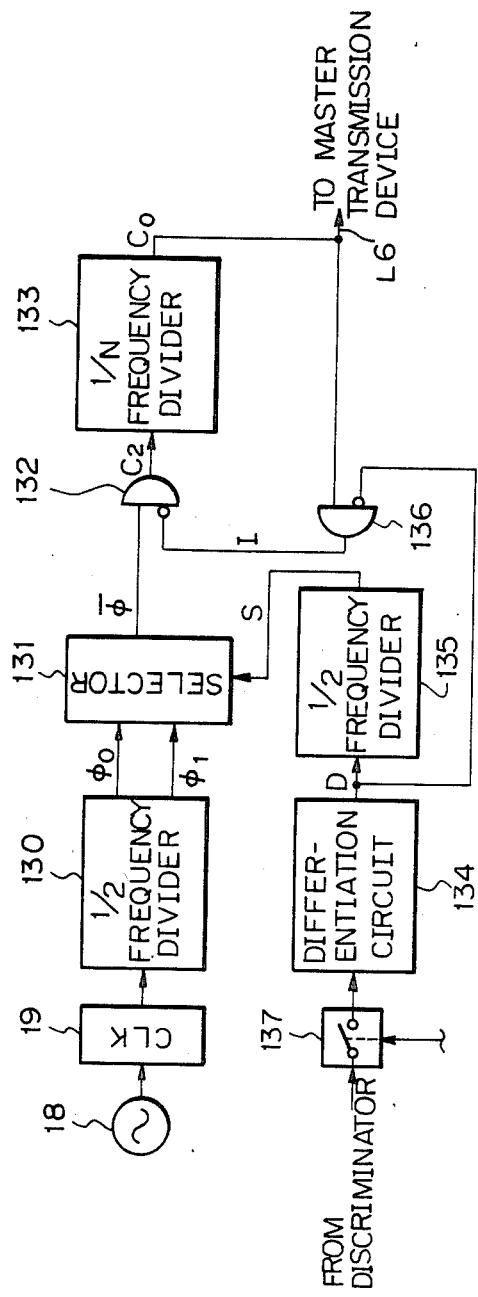
FIG. 13 illustrates a more detailed example of the timing recovery circuit together with phase extraction means of the master side transmitting-receiving unit shown in FIG. 11.

FIG. 13 illustrates a more detailed example of the timing recovery circuit together with the phase extraction means in the master side T/R unit 110 shown in FIG. 11. FIGS. 14A through 14I depict timing charts for explaining the operation of the circuit shown in FIG. 13. In FIG. 13, reference numeral 130 represents a ½ frequency divider, 131 a selector, 132 an AND gate, 133 a 1/N frequency divider, 134 a differentiation circuit, 135 a ½ frequency divider, 136 an AND gate, and 137 a switch.

The ½ frequency divider 130 produces the divided output pulses $\phi_1$ and $\phi_0$ with the waveforms shown in FIGS. 14A and 14B, respectively. Before issuance of the training signal TR, an output S is determined according to an individual condition of the related divide circuit and is produced from the ½ frequency divider. In response to the output S, the selector 131 now selects, for example, the $\phi_1$ side output pulse, and therefore, the output $\bar{\phi}$ from the selector 131 exhibits the waveform shown in FIG. 14F. The character $\bar{\phi}$ denotes an inversion in level with respect to an output pulse $\phi$ ($\phi_0$ or $\phi_1$). The selected output $\bar{\phi}$ is input to the AND gate 132 and allowed to pass therethrough as an output $C_2$ (FIG. 14I) by an inverted gate input I. The gate output I is shown in FIG. 14H. The output $C_2$ is applied to the 1/N frequency divider 133, where the number N is preferably equal to 48. The thus frequency divided output $C_o$ from the divider 133 is supplied, via a line L6, to the master transmission device 111. The waveform of the output $C_o$ is shown in FIG. 14G.

When the training signal TR is generated in the master side T/R unit 110, the signal TR turns the switch 137 ON. Therefore the output from the discriminator starts being supplied to the differentiation circuit 134. The thus differentiated output is represented by, for example, D in FIG. 14D. The output D is applied, on the one hand, to the ½ frequency divider 135, and on the other hand, to the AND gate 136. When the output D is a high level, the AND gate 136 is closed thereby. Every time two successive outputs D are applied to the ½ frequency divider 135, the divider 135 changes the level of its output S, as shown at the middle of FIG. 14E. In response to the output S now changed to the high level, the selector 131 changes the selection of the output pulse from $\phi_1$ to $\phi_0$.

On the other hand, the AND gate 136 produces the gate output I at a high level in response to the output D inverted to a high level at the input of the AND gate 136. The thus obtained gate output I is inverted to a low level at the input of the AND gate 132 and closes this gate 132. Therefore, the first of the output pulses, now the $\phi_0$ side output pulses selected by the selector 131, is inhibited from passing through the gate 132, as schematically illustrated by the pulse $\phi_0$ indicated by a broken line in FIG. 14I. This means that the output $C_o$ lags in phase, since the one output pulse $\phi_0$ is not applied to the divider 133, and thereby the internal clock is synchronized in phase with the received signal $S_{R1}$. Inversely, where the output (FIG. 14C) from the discriminator exists and, at the same time, the output $C_o$ (FIG. 14G) is a low level at the time the differentiated output D is to be produced, the pulse $\phi_0$ is not inhibited and passes through the AND gate 132. In this case, accordingly, the output $C_o$ leads in phase, due to the existence of the first output pulse $\phi_0$ (corresponding to the broken line pulse shown in FIG. 14I).

When the above-mentioned phase adjustment is completed, i.e., the phase difference $\theta_4$ of FIG. 12D reaches almost zero, generation of the training signal TR is stopped. Therefore the switch 137 is turned OFF by the stoppage of the signal TR, and no further output from the discriminater is supplied to the differentiation circuit 134. Thus, the status of the selector 131 at the end of the phase adjustment is maintained as is after the time t2 of FIG. 12D, so that either $\phi_0$ or $\phi_1$ from the divider 130, determined by the last status of the selector 131, is supplied to the divider 133 to produce $C_o$ as a timing recovery output having a desired phase and the thus determined output $C_o$ is supplied, from now on, to the master transmission device 111 to maintain normal data transmission. It should be noted that the relationship in timing explained with reference to FIG. 5 is still satisfied even during the period of phase adjustment. That is, when the master side T/R unit 110 achieves the above-mentioned timing recovery with the use of the received signal $S_{R1}$, a send signal $S_{S1}$ does not exist in the master side T/R unit 110. This means that the timing recovery is not influenced by an echo signal which which be induced by the signal $S_{S1}$, and thus highly accurate timing recovery can be attained.

Returning again to FIGS. 3, 4, 8, and 9, the frame pulse generator 41 and the timing pulse generator 51 will be explained in detail below. The frame pulse FP can be composed of a 6 bit train, for example, "10000M", and the timing pulse TP also can be composed of a 4 bit train, for example, "0110". The character M denotes a bit, the logic of which changes to "1" and "0" alternately in sequence for every frame.

FIG. 15 is a detailed example of the frame pulse generator. The frame pulse generator 41 is constructed as a presettable shift register. That is, the generator 411 is comprised of a load register 141, a parallel/serial (P/S) shift register 142 and a flip-flop 143. According to the above example, the logic "10000" of the 5 bit train is loaded in advance in the load register 141. The 6 bits are set all at once in the P/S shift register, together with the bit M supplied from the flip-flop. Then the 6 bit train is produced bit by bit, in synchronism with a clock CLK1 to obtain the frame pulse FP. The flip-flop is triggered by a clock CLK2. The clock CLK2 has the same period as that of the frame. i.e., T of FIG. 5A. Therefore, logic value "1" and "0" are generated, as the bit M, alternately, at every frame. Although the clock CLK1 is the same as the internal clock.

It should be understood that the timing pulse generator 42 can also be constructed in a manner similar to that of the above-mentioned frame pulse generator 41, but the content of the load register 141 and the M bit position should be modified so as to conform with the bit train of the timing pulse TP. Further it is also possible to form these generators 41 and 42 integrally as one body, by using a 10 (=6+4) bit P/S shift register and a load register which stores therein both the sets of the above-mentioned 6 and 5 bit trains.

Regarding the frame pulse FP and the timing pulse TP, it is possible to cancel the timing pulse TP. In this case, the frame pulse is utilized as the timing pulse TP simultaneously. This conception can be applied to the above-mentioned embodiments, however, some changes must be effected in the receiver part.

Figure 16:
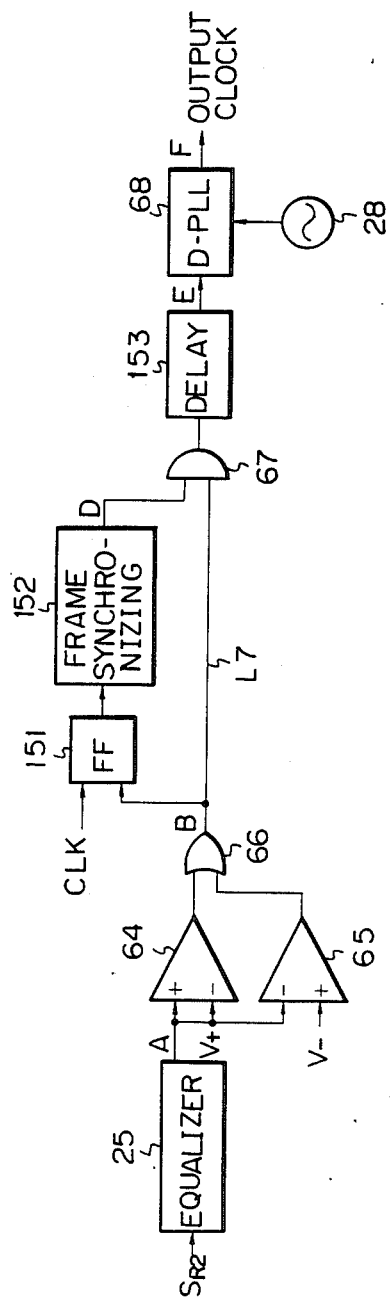
FIG. 16 is a circuit diagram of a modified receiver part to be operated with the frame pulse FP only.

FIG. 16 is a circuit diagram of a modified receiver part to be operated with the frame pulse FP only. It should be understood that although FIG. 16 shows the modified slave side receiver part as an example, the related modification also can be effected in the master side receiver part in a similar way to that of FIG. 16. FIGS. 17A through 17F depict waveforms of signals appearing in FIG. 16 at the portions A through F, respectively. FIG. 16 corresponds to the previously explained FIG. 6, and therefore, some members used in the circuit of FIG. 6 art also are used in the circuit of FIG. 16. The received signal $S_{R2}$ is applied to the equalizer 25 to produce the equalized signal with the waveform of FIG. 17A. The output from the equalizer 25 is applied to both the comparators 64 and 65 to produce, via the OR gate 66, the compared output with the waveform of FIG. 17B. The output at the portion B is applied to, on the one hand, a flip-flop (FF) 151 and, on the other hand, to the AND gate 67. The flip-flop 151 momentarily holds logic "1" or "0" of the compared output from the OR gate 66 in synchronism with the internal clock CLK, which is identical to the output clock from the digital phase-locked loop (D·PLL) circuit 68. A frame synchronizing circuit 152 receives the output from the flip-flop 151 and produces therein a frame pulse detection signal with the waveform of FIG. 17C. In response to the frame pulse detection signal, the circuit 152 creates a clock window pulse with the waveform of FIG. 17D. It should be noted that the clock window pulse illustrated in FIG. 17D is created in response to the frame pulse detection signal which has been generated immediately before the occurrence of the detection signal illustrated in FIG. 17C. Once frame synchronization is established by the circuit 152, it is easy to find the frame pulse detection signal (FIG. 17C). This is because each frame pulse FP has the same bit pattern as any other, and further, the frame pulses are supplied periodically with a constant time interval T therebetween.

The above-mentioned clock window pulse is used to allow the predetermined edge portion (refer to "EDGE" in FIG. 17B) of the frame pulse FP to pass through the AND gate 67 selectively. In other words, the clock window pulse inhibits the compared output corresponding to the received data RD2 from passing through the AND gate 67. This is because it is impossible to extract the clock component from the compared output of RD2, since the RD2 signal has deleterious jitter due to inter symbol interference. The jitter is schematically illustrated by double lines at the leading and falling edges of each compared output pulse shown in FIG. 17B.

The edge portion passed via a line L7 and the AND gate 67 is input to a delay circuit 153 through which a predetermined delay time (dt) is applied to the edge portion to obtain a delayed edge portion with the waveform of FIG. 17E. The delay is important to make the rising edge of the edge portion coincide with the center of each compared output. Thus, a virtual timing pulse is obtained which is synchronized with the rising edge of the delayed edge portion, and therefore, the virtual timing pulse can hit the center of each of the received data pulses, and therefore, a highly accurate timing recovery can be expected since the above-mentioned jitter portions are excluded. Based on the above-mentioned fact, a desired output clock (refer to FIG. 7F) is obtained which is correctly synchronized with the virtual timing pulse derived from the frame pulse per se, with the aid of the D·PLL circuit 68 driven by the output pulse (E) from the delay circuit 153. In this case a certain problem may arise in that it is difficult to synchronize the D·PLL circuit 68 with the output pulse (E) promptly, since the pulse (E) is not generated continually, but periodically. The above-mentioned problem, however, can be overcome simply by, for example, shortening the frame period (T) or by increasing the number of edge portions in each frame pulse FP adaptively.

As explained above in detail, in the digital transmission system of the present invention, timing recovery and the echo suppression can be performed with a high degree of accuracy without employing special hardware or using a special algorithm.

We claim:
1. A digital transmission system, comprising:
at least two transmitting-receiving (T/R) units:
a single transmission line connected therebetween, the system being operated under a full duplex communication mode; and at least one of said T/R units comprising a timing control means and a first transmission control means, said timing control means for synchronizing an internal clock of the at least one T/R unit, only during a predetermined period, with a received signal applied to the at least one T/R unit; and said first transmission control means for inhibiting, only during said predetermined period, a transmission of a send signal from the at least one T/R units to be supplied to the other T/R unit.

2. A system as set forth in claim 1, further comprising a master clock source providing a master internal clock and a slave clock source providing a slave internal clock, wherein one of said T/R units works as a master side T/R unit driven with the master internal clock defined by said master clock source and the other T/R unit works as a slave side T/R unit driven with the slave internal clock defined by the slave clock source in subordination to said master clock source, and both said timing control means and said first transmission control means are included in the slave side T/R unit, and further comprising second transmission control means for inhibiting send signal transmission and included in the master side T/R unit.

3. A system as set forth in claim 2, wherein said second transmission control means in the master side T/R unit transmits a frame pulse, a timing pulse and send data sequentially in order to set up each frame, and, in the slave side T/R unit, frame synchronization is performed with the use of the thus transmitted frame pulse and then said timing control means initiates a timing recovery with the use of the thus transmitted timing pulse to reproduce the thus transmitted send data, as received data, at the same time, said first transmission control means in the slave side T/R unit inhibits a transmission of a slave side send signal supplied from the master side T/R unit.

4. A system as set forth in claim 3, wherein said second transmission control means of the master side T/R unit creates a non-signal duration period in each frame after the end of the transmission of the master side send data.

5. A system as set forth in claim 4, wherein said first transmission control means in the slave side T/R unit comprises a first sequence controller and a first selector, said second transmission control means in the master side T/R unit comprises a second sequence controller and a second selector, said second selector is controlled by the second sequence controller such that the frame pulse, the timing pulse, the send data, and the non-signal duration period are issued in order, and the first selector is controlled by the first sequence controller, both in the slave side T/R unit, such that issue of the slave side send data signal is inhibited only during the reception of the frame pulse and the timing pulse supplied from the master side T/R unit.

6. A system as set forth in claim 5, wherein said timing control means in the slave side T/R unit comprises said first sequence controller which determines a particular time where the internal clock of the slave side T/R unit is to be synchronized with the received signal supplied from the master side T/R unit.

7. A system as set forth in claim 6, wherein said first sequence controller in said timing control means of the slave side T/R unit initiates a line equalization only during the reception of the frame pulse and the timing pulse supplied from the master side T/R unit.

8. A system as set forth in claim 7, wherein said slave side T/R unit further comprises an echo suppression circuit connected to said first sequence controller and adaptively adjusting echo suppression, and said first sequence controller initiates the adaptive adjustment of said echo suppression circuit in the slave side T/R unit only during the non-signal duration.

9. A system as set forth in claim 8, wherein said slave side T/R unit further comprises an echo suppression circuit connected to said second sequence controller and adaptively adjusting echo suppression, and said second sequence controller initiates the adaptive adjustment of said echo suppression circuit of the master side T/R unit during the generation of said frame pulse and timing pulse to be transmitted to the slave side T/R unit.

10. A system as set forth in claim 9, wherein each of said sequence controllers comprises a read only memory which stores data specifying control sequences.

11. A system as set forth in claim 10, wherein said slave side T/R unit includes a synchronizing circuit, a timing recovery circuit, an equalizer and a discriminator, and in the slave side T/R unit, said first sequence controller cooperates with said first selector, said echo suppression circuit, the synchronizing circuit and said timing recovery circuit, said timing recovery circuit receives an output from said equalizer performing said line equalization and produces an output clock which is the internal clock synchronized with the received signal, under control of said first sequence controller, and the synchronizing circuit receives an output from said discriminator and generates control signals to be supplied to the first sequence controller, an output from the said discriminator is a bit train of "1" and "0" determined in response to the output from said equalizer.

12. A system as set forth in claim 11, wherein said synchronizing circuit comprises:
  a frame pattern detecting circuit for finding said frame pulse and producing a detection output;
  a frame synchronizing back-up circuit for receiving the detection output from the frame pattern detecting circuit and determining whether the detection has been accomplished; and
  a frame synchronization counter which receives the detection output and counts a predetermined number of bits comprising each frame every time the detection is accomplished, so that correct establishment of frame synchronization is communicated to the first sequence controller to issue a closk window pulse indicating the existence of said timing pulse.

13. A system as set forth in claim 12, wherein said timing recovery circuit comprises:
  upper side and lower side comparators for commonly receiving the output from said equalizer and providing outputs;
  an OR gate for producing an OR'ed signal from the outputs from said comparators;
  an AND gate which allows the OR'ed signal to pass therethrough when said clock window pulse is applied thereto; and
  a digital phase-locked loop circuit for synchronizing the internal clock with the timing pulse, thereby producing said output clock to be used as a basic clock in the slave side T/R unit.

14. A system as set forth in claim 1, wherein one of said T/R units comprises a master side T/R unit including a master clock source, said master side T/R unit driven with an internal clock produced by said master clock source and the other of said T/R units comprising a slave side T/R unit including a slave clock source, said slave T/R unit driven with an internal clock produced by said slave clock source in subordination to said master clock source, said timing control means is incorporated in each of the slave side T/R unit and the master side T/R unit, respectively, as a first timing control means and a second timing control means, and said first transmission control means is incorporated in the slave side T/R unit, and an identical second transmission control means is incorporated in the master side T/R unit.

15. A system as set forth in claim 14, wherein said second transmission control means in the master side T/R unit transmits a frame pulse, a timing pulse and send data sequentially in order to set up each frame, and, in the slave side T/R unit, frame synchronization is performed using the transmitted frame pulse and said first timing control means initiates a timing recovery using the transmitted timing pulse to reproduce the transmitted data, as received data, at the same time, said first transmission control means of the slave side T/R unit, first, inhibits a transmission of the slave side send signal to be supplied to the master side T/R unit only during reception of said frame pulse and said timing pulse supplied from the master side T/R unit, and thereafter the first transmission control means starts transmission of said send signal, in the form of the frame pulse, the send data, and the timing pulse arranged sequentially in order.

16. A system as set forth in claim 15, wherein each of said first and second transmission control means creates a non-signal duration period in each frame, the non-signal duration period inserted by the first transmission control means follows after the timing pulse, while the nonsignal duration period inserted by the second transmission control means follows after the send data, where each non-signal duration period comprises a first duration period and a second duration period arranged in order, the first duration is equal to twice the transmission delay time produced during the transmission along said transmission line and the second duration is long enough to accept the timing pulse supplied from the other T/R unit.

17. A system as set forth in claim 16, wherein said second timing control means of the master side T/R unit performs timing recovery with the use of the received timing pulse supplied from the slave side T/R unit during said second duration period of said non-signal duration period.

18. A system as set forth in claim 17, wherein said master side T/R unit includes an echo suppression circuit and said second timing control means initiates an adaptive adjustment of said echo suppression circuit in the master side T/R unit using the frame pulse and the timing pulse generated from the master side.

19. A system as set forth in claim 18, wherein said slave side T/R unit includes an echo suppression circuit and said first timing control means initiates an adaptive adjustment of said echo suppression circuit in the slave side T/R unit using the timing pulse generated from the slave side.

20. A system as set forth in claim 19, wherein
said first transmission control means in the slave side T/R unit comprises a first sequence controller and a first selector controlled by the first sequence controller such that the frame pulse, the send data, the timing pulse and the non-signal duration period are issued in order,
said second transmission control means in the master side T/R unit comprises a second sequence controller and a second selector controlled by the second sequence controller such that the frame pulse, the timing pulse, the send data and the non-signal duration portion are issued in order,
said first timing control means in the slave side T/R unit is a part of said first sequence controller; and
said second timing control means in the master side T/R unit is a part of the second sequence controller.

21. A system as set forth in claim 20, wherein each of said first and second sequence controllers comprises a read only memory which stores data specifying control sequences.

22. A system as set forth in claim 19, wherein, in the master side T/R unit, said second timing control means performs said timing recovery with the use of, other than the received timing pulse, the received data appearing in said first duration period of the non-signal duration period following after said send data of the master side.

23. A system as set forth in claim 2, wherein said master side T/R unit includes phase component extraction means for extracting phase information and a timing recovery circuit, and said slave side T/R unit includes frequency component extraction means for extracting frequency information and a timing recovery circuit.

24. A system as set forth in claim 23, wherein said frequency component extraction means of the slave side T/R unit extracts the frequency component from the received signal supplied from the master side T/R unit to synchronize in frequency and phase the internal clock of the slave side T/R unit with the received signal using said timing recovery circuit of the slave side and then returns the synchronized signal, as a phase adjusting signal, to the master side T/R unit, the phase extraction means of the master side T/R unit synchronizes in phase the internal clock of the master side with the supplied phase adjusting signal using the timing recovery circuit of the master side, only during generation of a training signal in the master side used for initiating the master side timing recovery operation every time data transmission is to be started.

25. A system as set forth in claim 24, wherein, in the master side T/R unit, said phase extraction means and said timing recovery circuit are formed as a single circuit comprising:
a first frequency divider receiving the master closk and producing frequency divided output pulses each having a different phase;
a second frequency divider supplying a selection signal;
a selector providing either one of said output pulses in dependence on the selection signal supplied from said second frequency divider;
a differentiation circuit providing a differentiated output in response to an input applied thereto;
a master side discriminator;
a switch allowing the input, supplied to the differentiation circuit to pass therethrough under control of said training signal, which input is the output signal supplied from said master side discriminator, which produces logic "1" and "0" in response to the received signal;

a first AND gate receiving, at a first input, the resultant output from said first AND gate and, at a second input, said output pulse selected by said selector; and a third frequency divider receiving the resultant output from said second AND gate to provide the frequency divided output pulse to a second input of said first AND gate, and as the master side internal clock.

26. A system as set forth in claim 2, wherein said second transmission control means in the master side T/R unit transmits a frame pulse and send data sequentially in order to set up each frame, while, in the slave side T/R unit, frame synchronization is performed using the transmitted frame pulse and then said timing control means initiates a timing recovery using the transmitted frame pulse to reproduce the transmitted send data, as received data, at the same time, said second transmission control means in the slave side T/R unit inhibits transmission of the slave side send signal to be supplied to the master side T/R unit only during reception of said frame pulse supplied from the master side T/R unit.

27. A system as set forth in claim 26, wherein the T/R receiving unit includes an equalizer producing an output and in the T/R receiving unit the frame pulse performs the frame synchronization and the timing recovery, by means of a single circuit comprising:

upper side and lower side comparators receiving the output from said equalizer which performs line equalization and producing outputs;

an OR gate for producing an OR'ed signal from outputs from said upper and lower side comparators;

a flip-flop operative to momentarily hold logic "1" or "0" of the OR'ed signal in synchronism with the internal clock;

a frame synchronizing circuit producing a frame pulse detection signal and creating a clock window pulse based on the frame pulse detection signal;

an AND gate receiving, at a first input, said clock window pulse and, at a second input, said OR'ed output, so as to allow an edge portion of the frame pulse to pass therethrough;

a delay circuit shifting the phase of the thus passed edge portion such that the phase shifted edge portion aligns with the center of the received data; and a digital phase-locked loop circuit operative to produce the output clock, as the internal clock, which is controlled in phase by said phase shifted edge portion.

28. A system as set forth in claim 14, wherein said second transmission control means in the master side T/R unit transmits a frame pulse and send data sequentially in order to set up each frame, and, in the slave side T/R unit, frame synchronization is performed using the transmitted frame pulse and then said first timing control means initiates a timing recovery using the transmitted frame pulse to reproduce the transmitted send data, as received data, at the same time, said first transmission control means of the slave side T/R unit, first, inhibits a transmission of the slave side send signal to be supplied to the master side T/R unit only during reception of said frame pulse supplied from the master side T/R unit, and thereafter the first transmission control means starts a transmission of said send signal, in the form of the frame pulse and send data arranged sequentially in this order.

29. A system as set forth in claim 28, wherein the T/R receiving unit includes an equalizer producing an output and in the T/R receiving unit the frame pulse performs the frame synchronization and the timing recovery, by means of a single circuit comprising:

upper side and lower side comparators receiving the output from said equalizer which performs a line equalization and producing outputs;

an OR gate for producing an OR'ed signal with respect to outputs from said upper and lower side comparators;

a flip-flop momentarily holding logic "1" or "0" of the OR'ed output in synchronism with the internal clock;

a frame synchronizing circuit producing a frame pulse detection signal and creating a clock window pulse based on the frame pulse detection signal;

an AND gate receiving, at a first input, said clock window pulse and, at a second input, said OR'ed output, so as to allow an edge portion of the frame pulse to pass therethrough;

a delay circuit shifting the phase of the thus passed edge portion such that the phase shifted edge portion aligns with the center of the received data; and a digital phase-locked loop circuit operative to produce the output clock, as the internal clock, which is controlled in phase by said phase shifted edge portion.

30. A digital transmission system for sending first and second data, comprising:

a master unit, said master unit comprising:
a master frame pulse generator;
a master timing pulse generator;
a master selector operatively connected to said master frame pulse and said master timing pulse generators and to receive the first send data;
a master unipolar-bipolar converter operatively connected to said master selector;
a master echo suppression circuit operatively connected to said master unipolar-bipolar convertor;
a master hybrid operatively connected to said master unipolar-bipolar convertor;
a master adder operatively connected to said master hybrid and said master echo suppression circuit;
a master equalizer operatively connected to said master adder;
a master discriminator operatively connected to said master equalizer and producing first receive data; and
a first master sequence controller connected to said echo suppression circuit and said sequence controller;

a transmission line connected to said master hybrid; and a slave unit operatively connected to said transmission line and comprising;
a slave hybrid operatively connected to said transmission line;
a slave frame pulse generator;
a slave selector operatively connected to said slave frame pulse generator and to receive the second send data;
a slave unipolar-bipolar converter connected to said slave selector and said slave hybrid;
a slave echo suppression circuit operatively connected to said slave unipolar-bipolar converter;
a slave adder operatively connected to said slave hybrid and said slave echo suppression circuit;

a slave equalizer operatively connected to said slave adder;
a slave timing recovery unit operatively connected to said slave equalizer;
a slave discriminator operatively connected to said slave equalizer and producing second receive data;
a slave synchronizing circuit operatively connected to said slave discriminator; and
a slave sequence controller operatively connected to slave synchronizing circuit, said slave timing recovery circuit, said slave selector and said slave echo suppression circuit.

31. A system as recited in claim 30, further comprising;
a master synchronizing circuit operatively connected to said master discriminator;
a second master sequence controller operatively connected to said master discriminator; and
a master timing recovery circuit operatively connected to said second master sequence controller and said master equalizer.

* * * * *

UNITED STATES PATENT AND TRADEMARK OFFICE
CERTIFICATE OF CORRECTION

PATENT NO.  : 4,679,188
DATED       : July 7, 1987
INVENTOR(S) : FUKUDA ET AL.

It is certified that error appears in the above-identified patent and that said Letters Patent is hereby corrected as shown below:

[57]  ABSTRACT

Line 4, "unit the first" should be --units (the first)--
    Line 5, "units" should be --unit--
    Line 6, delete "thus" and delete "with".

Column 1, line 41, after "an" insert --algorithm--.

Column 7, line 6, "$V_{30}$" should be --$V_{+}$--.

Column 9, line 33, "$S_{RR1}$" should be --$S_{R1}$--.

Column 13, line 17, "411" should be --41--
        line 28, "value" should be --values--
        line 57, "art also are" should be --are also--.

Column 16, line 49, "closk" should be --clock--.

Column 18, line 52 "closk" should be --clock--.

Signed and Sealed this

Twenty-second Day of March, 1988

Attest:

DONALD J. QUIGG

Attesting Officer      Commissioner of Patents and Trademarks